No. 766,942. PATENTED AUG. 9, 1904.
E. EK.
MEASURING MACHINE OR METER.
APPLICATION FILED SEPT. 14, 1903.
NO MODEL. 2 SHEETS—SHEET 2.
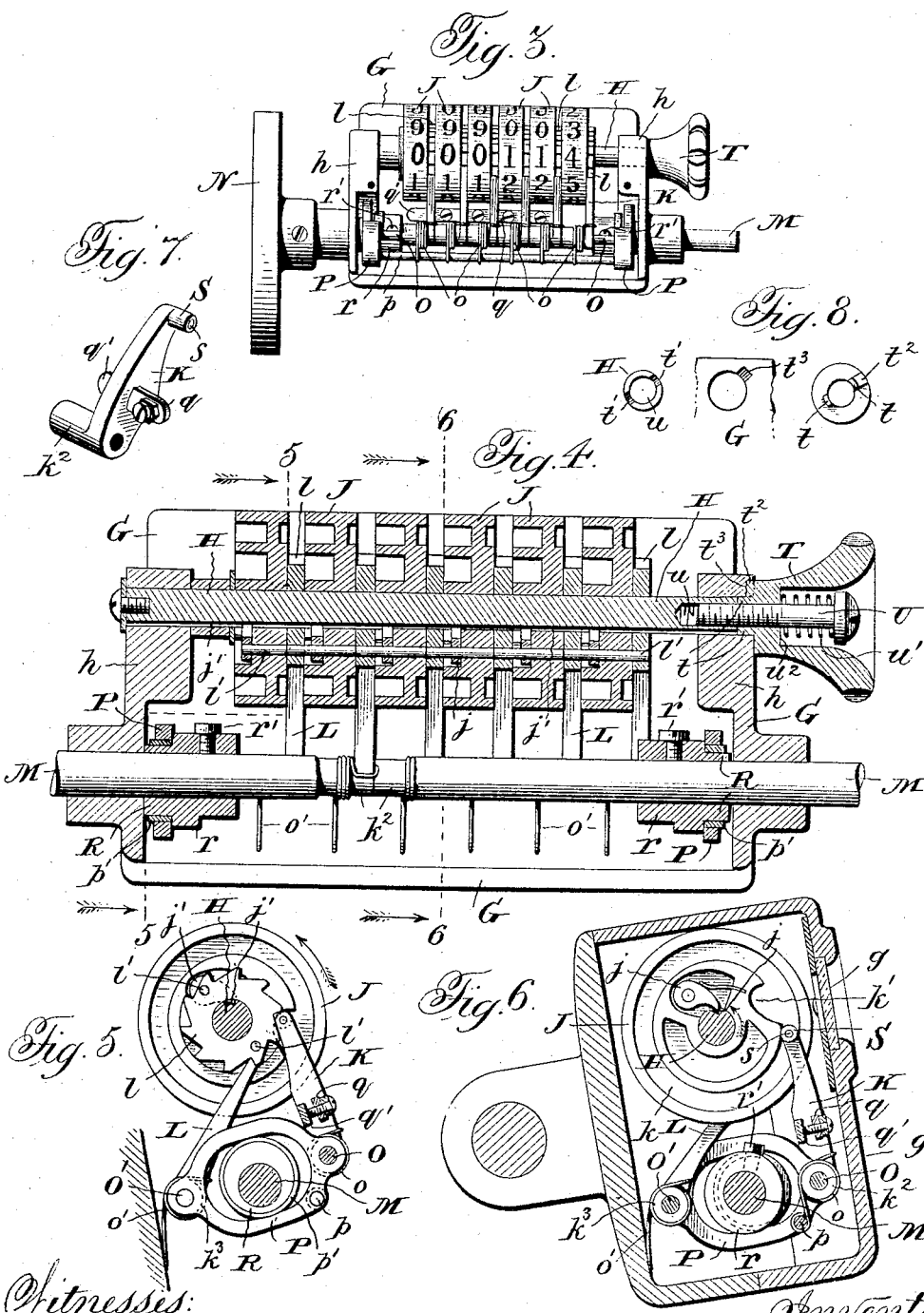
Witnesses:
Jas. E. Hutchinson
J. Donaldson
Inventor:
Emil Ek
By Bacon & Milans
Atty's No. 766,942. Patented August 9, 1904.

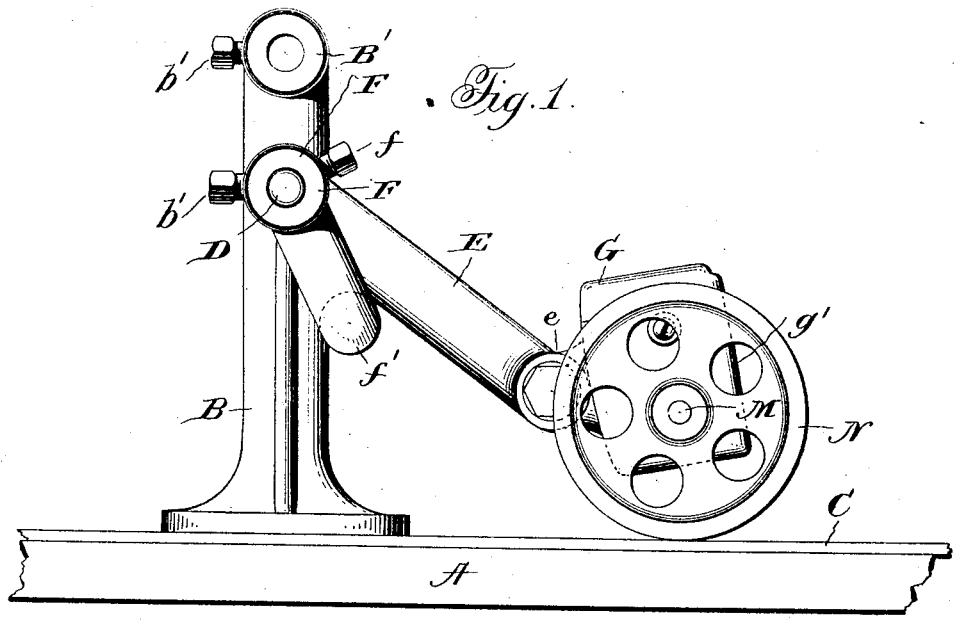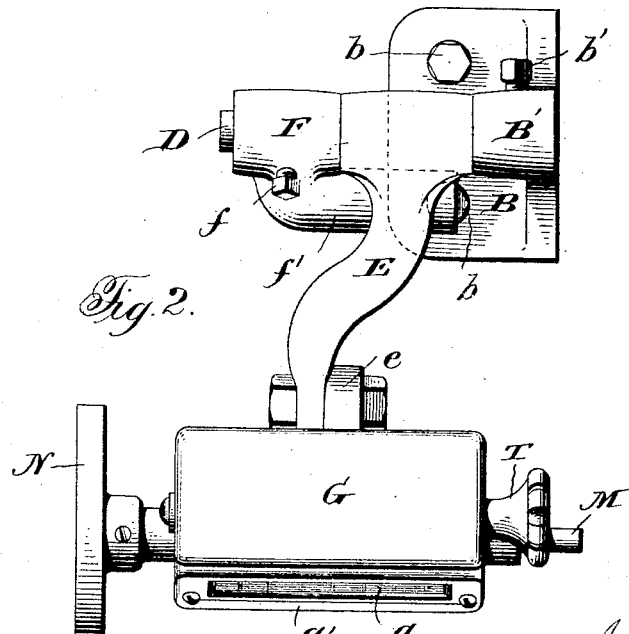

UNITED STATES PATENT OFFICE.

EMIL EK, OF PORTLAND, MAINE, ASSIGNOR TO ADDE & COMPANY, OF PORTLAND, MAINE.

MEASURING-MACHINE OR METER.

SPECIFICATION forming part of Letters Patent No. 766,942, dated August 9, 1904.

Application filed September 14, 1903. Serial No. 173,124. (No model.)

*To all whom it may concern:*

Be it known that I, EMIL EK, a citizen of the United States, residing at Portland, in the county of Cumberland and State of Maine, have invented certain new and useful Improvements in Measuring-Machines or Meters, of which the following is a specification, reference being had therein to the accompanying drawings.

This invention relates to an improved measuring-machine or meter which, as will be apparent to those skilled in the art, is susceptible of many adaptations and particularly useful for measuring the lengths of materials such as lumber, rails, beams, and similar articles.

The invention comprehends the provision of a measuring device comprising a plurality of disks or wheels arranged in parallel planes and mounted upon a common shaft, said disks or wheels carrying indicator characters, preferably numerals, in combination with operating mechanism whereby the disks are actuated individually and in series to collocate the numerals thereon in a predetermined position of alinement to form numbers indicative of the number of actuations of the machine. The operating mechanism for the disks or wheels is conveniently associated with a friction-wheel of a given peripheral measurement designed to traverse the work to be measured or to have said work passed thereover, so that the total represented by the exposed numerals on the disks when considered as a unit will represent the number of revolutions of the friction-wheel, and consequently the length of the work. For instance, if the peripheral measurement of the friction-wheel is one foot and the numerals on the three disks at the right of the machine read "114," (see Figures 2 and 3,) this number indicates that the wheel has traversed one hundred and fourteen revolutions upon the work being operated upon, and therefore said article is one hundred and fourteen feet in length.

The above example has been stated simply to afford a clear and ready understanding of the invention and is in no sense to be considered as confining the use of the machine.

The invention also embraces many novel details in the construction and operation of the several parts of the machine, as will be apparent from the detailed description hereinafter, when read in connection with the accompanying drawings, forming part hereof, and wherein a preferable embodiment of the invention is illustrated. It is, however, to be understood that in any future interpretation as to the scope of the present invention the same is not to be limited to any of the details disclosed except in so far as any such details may be specifically included in the hereto-appended claims.

In the drawings, Fig. 1 is a side elevation of the machine, showing the same in position for operation upon a strip of material. Fig. 2 is a plan view of the same. Fig. 3 is a front elevation with the fore part of the inclosing casing removed. Fig. 4 is a longitudinal vertical section, parts being broken away. Fig. 5 is a transverse sectional view on the line 5 5 of Fig. 4 looking in the direction of the arrow, parts being broken away. Fig. 6 is a view similar to Fig. 5 on the line 6 6 of Fig. 4 looking in the direction of the arrow, the inclosing casing being shown in place; and Figs. 7 and 8 are detail views.

Referring more specifically to the drawings, A designates a supporting bed or table.

B is an upright or bracket, shown in the present instance as being rigidly secured to the table A through the medium of bolts *b*, Fig. 2. In the type of machine involving this fixed bracket B the work to be operated upon is shifted beneath the friction-wheel N of the machine, to be referred to, said work being indicated at C as lying upon the bed A, so as to slide thereupon. Where the fixed bracket is dispensed with, the machine is bodily moved along the work, in which case the work is of course held in fixed position relative to the machine.

The upright or bracket B is provided with a plurality of bearings B', each having a binding-screw *b'*, arranged to impinge upon a stub-shaft D, to secure said shaft at one end in either of the bearings B', according to the thickness of the work to be operated upon and the corresponding desired operating plane of the machine.

Upon the shaft D at a point intermediate its ends an arm E is sleeved so as to swing freely thereupon, said arm at its free end being bolted to an ear $e$, projecting from the rear of the casing G of the machine proper. The arm E is held in position longitudinally of the shaft D by a stop F, the same being in the nature of a collar fitting the outer end of the shaft D and held thereto in adjusted position through the medium of a binding-screw $f$. The collar carries a downwardly and inwardly extending finger or stop $f'$, which projects into the path of swinging movement of the arm E, and by means of this finger or stop the adjustment of the operating plane of the machine is further facilitated, inasmuch as the finger or stop may be shifted upon quite an extensive arc beneath said arm E, thereby elevating or permitting the same to lower, as the case may be. Another function of finger or stop just referred to is to support the bulk of the weight of the machine which in larger structures is liable to damage by indentation the surface of the work—for example, soft lumber. It will be apparent that when the stub-shaft D is in the lowermost bearing of the upright or standard the machine is in position to operate upon relatively thin material, while on the other hand when said shaft is in the uppermost bearing the machine is in position to operate upon relatively thick material. Of course any number of bearings may be provided, two only being shown to avoid complicatedness in the description and illustration. The finger $f'$ also prevents sudden dropping of the machine upon the table or bed.

From the above description it is to be noted that the supporting instrumentalities therein set forth possess many novel characteristics which not only enable the machine to be supported in the particular position shown, but also permit the same being swung over upon the shaft D to a directly opposite position relative to the supporting-standard B, it simply being necessary to shift the finger or stop $f'$ to a position at the left of the upright corresponding to that which it now occupies. Fig. 1. Also should occasion arise when it is desirable to have the upright or standard B at the left of the machine the shaft D will be secured thereto so as to project outwardly therefrom in a direction opposite to that illustrated and the arm E and stop F rearranged to suit such reversal of parts.

Referring now to those figures in which the fore part $g'$ of the casing, Figs. 2 and 6, has been removed, $h$ designates oppositely-disposed alined bearings formed in the side walls of the casing G, and in these bearings a shaft H is rotatably mounted. Upon this shaft a plurality of disks or wheels J are sleeved, said disks or wheels occupying parallel planes and being free to rotate upon the said shaft H in one direction, but held against movement thereon in the opposite direction by spring-pressed pawls $j$, adapted to engage a longitudinally-disposed rib or shoulder $j'$ in the surface of the shaft. Each wheel or disk carries upon its periphery indicating characters, preferably numerals, from "0" to "9," so disposed relative to the figures of the adjoining disks and the actuating mechanism that the numerals of two or more adjacent disks may be collocated to form any totals involving units, tens, hundreds, tens of hundreds, and thousands, or even larger numbers, according to the predetermined capacity of the particular machine. In the corresponding face of each wheel or disk a groove $k$ is provided, said groove being concentric to the axis of the wheel and opening into a recess or pocket $k'$, located beneath and in radial alinement with "0" on the periphery of the wheel for a purpose to be pointed out. On the opposite face of the wheels a ratchet-wheel $l$ is secured, so as to rotate therewith, said ratchet being of relatively hard metal keyed to the indicator-wheel by pins $l'$, one pin also constituting a pivot for the pawl $j$, heretofore referred to. However, these ratchets may obviously be formed integral with the wheels. M is the main operating-shaft, to one end of which may be operatively connected any desirable actuating means, that shown being a friction-wheel N. This operating-shaft controls a series of actuating-pawls K, arranged to engage, under certain conditions to be mentioned, the teeth of the ratchets $l$, there being one pawl for each ratchet. The pawls are pivotally secured to the shaft O, carried by the forward ends of yokes P, the opposite ends of said yokes being pivoted upon a rod $O'$, fixed in the side walls of the casing. Retaining-pawls L, one for each ratchet $l$, are also pivoted upon the rod $O'$. Both the actuating-pawls K and retaining-pawls L project forwardly, as shown in Fig. 5, and are held with a tendency toward the ratchets $l$ by springs $o$ and $o'$, each spring $o$ having one end arranged to engage a pawl K and its opposite end embracing a rod $p$, carried by the yokes and arranged parallel to the shaft O, while each spring $o'$ has a portion engaging the pawl L and an oppositely-extending portion engaging the inner wall of the casing G, the intermediate portions of both sets of springs being coiled around the hubs $k^2 k^3$, respectively, of said pawls. To properly support the pawls K in place and prevent the rolls S, to be hereinafter more fully described, from dropping into the pockets $k'$ before the proper time, said pawls are provided with oppositely-disposed flanges $q q'$, projecting laterally from the opposite sides thereof, the flanges $q$ being arranged at a point somewhat away from the inner edge of the pawls, while the flanges $q'$ are arranged immediately adjacent to said inner edge, whereby the flanges of each adjoining pair of pawls will overlie, as clearly shown in Figs. 5 and 6, so that each pawl supports the adjacent pawl immediately to the left thereof. The lower or under flange $q'$ of each pair is imperforate, while the upper flange $q$ has a screw-threaded aperture therethrough, through which passes a screw Q, adapted to be adjusted to impinge upon said lower or under flange, whereby the pawls may be readily adjusted to proper elevations. The arrangement just described also facilitates the proper spacing apart or centering of the actuating-pawls K in the spaces between the indicating wheels or disks, so as to prevent frictional engagement of said pawls with the edges of said disks, which might impede the operation of the machine or cause unnecessary wear of the parts thereof. At the opposite ends of the operating-shaft M eccentrics R are adjustably secured through the medium of collars $r$, integral therewith, and binding-screws $r'$, said eccentrics carrying straps or rings $p'$, closely fitting the yokes P. When the machine is in operative condition, the eccentrics are similarly positioned, so as to simultaneously and equally shift their respective yokes.

Projecting laterally from the free end of each pawl K is a pin $s$, carrying an antifriction device, preferably a roller S. This roller projects into the groove $k$ of the adjacent wheel or disk J, and owing to the relative proportions of the parts the pawl K, to which the roller is attached, will be normally held out of engagement with its ratchet $l$ or until the wheel or disk is so far rotated that the roller will be forced by the action of the spring of its pawl K into the recess $k'$, at which time the nose of the pawl will engage a tooth on its ratchet-wheel $l$, and in the next step of the operation of the machine the pawl will shift the ratchet-wheel a distance of one tooth, which will be sufficient to display a different numeral through a sight-opening $g$ in the casing. The first actuating-pawl K, which is the pawl at the extreme right of the series, is in constant engagement with its ratchet-wheel, so that in this one instance only the roller is dispensed with.

The operation of the machine may be now followed. The machine being held in fixed position, as hereinbefore described, the swinging arm E is lowered, as in Fig. 1, the stop-finger $f'$ having been previously adjusted, as described, and the lumber or other work to be measured is slipped beneath the friction-wheel N. The work is then shifted in a straight line to cause rotation of the wheel N, which rotation of said wheel in turn rotates the eccentric R to rock the yokes P in an approximately vertical direction upon the shaft O'. This vertical movement of the yokes carries the shaft of the actuating-pawls in a corresponding direction, and as the arrangement is such that the yokes elevate but once for each complete rotation of the wheel N it will be seen that the constantly-acting pawl at the right of the series will shift the units-wheel correspondingly—that is, the distance of one tooth of its ratchet for each revolution of the friction-wheel—thereby consecutively advancing the numerals on the periphery of said wheel to present said numerals before the sight-opening $g'$. When the first disk or wheel of the series has been rotated nine steps, so as to have the numeral "9" appear through the sight-opening, the recess $k'$, opening to the groove $k$ in the side of the said first wheel, will come directly beneath the roller S, carried by the second actuating-pawl of the series, thereby permitting the spring of said pawl to force the same inwardly, carrying its roller into said recess, whereupon the pawl will be thrown into operative engagement with a tooth of the ratchet carried by the second or tens wheel of the series. Upon the next revolution of the actuating-wheel and the consequent elevation of the actuating-pawls the tens-wheel will be shifted to present its numeral "1" in longitudinal alinement with "0" of the first wheel, thereby forming the number "10," as is obvious, and the next step of the operation will retract the roller of the second actuating-pawl from its recess and back into the groove $k$ until the units-wheel has been actuated nine more steps, when the second or tens wheel will be shifted the distance of another numeral to form "20." The progressive operation of the third or hundreds and fourth or tens-of-hundreds wheels, and so on, according to the number of wheels employed, is the same as that just defined in relation to the units and tens wheels.

During the operation of the machine the wheels J rotate in the direction of the arrow, Fig. 5, carrying the pawls M around the shaft H, said shaft being held against rotation by a spring-actuated lock T, which is in the nature of a handpiece formed at its inner end with a pair of lugs $t$, arranged to engage correspondingly-shaped recesses $t'$ in the end of the shaft H. One of the lugs has an enlarged inner portion $t^2$ arranged to fit a correspondingly-shaped recess $t^3$ in the side of the casing G. A screw U passes loosely through the bore of the handpiece and engages a screw-threaded socket $u$ in the end of the shaft H, a coil-spring $u'$ being interposed between the head of the screw U and a shoulder $u^2$ on the said handpiece. It will thus be seen that when the lugs of the handpiece are in engagement with the shaft H and the recess in the side of the casing the shaft H will be effectually held against rotation. However, when it is desired to return all of the indicator disks or wheels to normal position, with their corresponding numerals in horizontal alinement, it is simply necessary to retract the handpiece T against the tension of the spring $u'$ sufficiently to disengage the same from the recess $t^3$ of the casing, when the handpiece may be readily turned in the direction indicated by the arrow in Fig. 6 to bring the longitudinal shoulder $j'$ of the shaft H into engagement with all of the pawls, and a continued rotation of the shaft will cause all of the wheels or disks to be simultaneously rotated and brought to the position desired—for instance, with the line of zeros opposite the sight-opening of the casing—it being understood that the lugs $t^3$ and recesses $t'$ are of greater length than the depth of the recess $t^3$, so that the withdrawing of the handpiece from engagement with the recess $t^3$ will not be sufficient to disengage the lugs $t$ from the recesses $t'$ in the end of the shaft.

An additional feature of importance characteristic of the present invention resides in the fact that by the peculiar disposition of the actuating and retaining pawls and the arrangement of the yokes and eccentrics the friction-wheel or other operating device may be reversed at will and the indicator wheels or disks uniformly rotated in the same direction at all times—that is, the friction-wheel may be rotated forwardly or backwardly, whichever may be found expedient under the conditions attending the particular use of the machine without changing the normal actuation or direction of rotation of the indicator-wheels.

Having thus described the invention, what is claimed as new, and desired to be secured by Letters Patent, is—

1. In combination with a series of indicating-wheels, operating means therefor including separated carrying members, a rod upon which said members are pivoted, a rod carried by the free ends of said carrying members, an actuating-pawl pivoted upon said last-mentioned rod, a ratchet-wheel arranged to be engaged by said pawl, means for rocking said carrying members for operating said actuating-pawl, and a retaining-pawl also arranged to engage said ratchet-wheel pivoted upon said first-mentioned rod.

2. In combination with a series of indicating-wheels, operating means therefor including separated carrying members, a rod upon which said members are pivoted, a rod carried by the free ends of said carrying members, an actuating-pawl pivoted upon said last-mentioned rod, a ratchet-wheel arranged to be engaged by said pawl, an eccentric engaging the carrying members for rocking the same to operate the said actuating-pawl, and a retaining-pawl also arranged to engage said ratchet-wheel pivoted upon said first-mentioned rod.

3. In combination with a series of indicating-wheels, operating means therefor including separated yokes, a rod upon which said yokes are pivoted, a rod carried by the free ends of said yokes, an actuating-pawl pivoted upon said last-mentioned rod, a ratchet-wheel arranged to be engaged by said pawl, means for rocking said yokes for operating said actuating-pawl, and a retaining-pawl also arranged to engage said ratchet-wheel pivoted upon said first-mentioned rod.

4. In combination with a series of indicating-wheels, operating means therefor including separated yokes, a rod upon which said yokes are pivoted, a rod carried by the free ends of said yokes, an actuating-pawl pivoted upon said last-mentioned rod, an eccentric engaging the yokes for rocking the same to operate the said actuating-pawl, and a retaining-pawl also arranged to engage said ratchet-wheel pivoted upon the first-mentioned rod.

5. In combination with a series of indicating-wheels, operating means therefor including separated yokes, a rod upon which said yokes are pivoted, a rod carried by the free ends of said yokes, an actuating-pawl pivoted upon said last-mentioned rod, an eccentric engaging the yokes for rocking the same to operate the said actuating-pawl, a retaining-pawl also arranged to engage said ratchet-wheel pivoted upon the first-mentioned rod, and a pin constituting a securing device for the ratchet-wheel and a pivot for the pawl.

6. In combination with a series of indicating-wheels, operating means therefor including separated yokes, a rod upon which said yokes are pivoted, a rod carried by the free ends of said yokes, an actuating-pawl pivoted upon said last-mentioned rod, an eccentric engaging the yokes for rocking the same to operate the said actuating-pawl, and a retaining-pawl also arranged to engage said ratchet-wheel pivoted upon the first-mentioned rod.

7. In combination with a rotary indicating member, a shaft upon which the same is mounted, said shaft being provided with a shoulder, means for rotating said member in one direction including a ratchet-wheel rigidly secured to said member, an actuating-pawl for said ratchet-wheel, a spring-pressed pawl carried by said member arranged to engage the shoulder of the supporting-shaft to prevent rotation of said member in a reverse direction, and a pin constituting a securing device for the ratchet-wheel and a pivot for the pawl.

8. In combination with indicating instrumentalities, a series of ratchet-wheels, pawls arranged to engage said ratchet-wheels, and adjustable means carried by the pawls for regulating their distance apart.

9. In combination with indicating instrumentalities, a series of ratchet-wheels, pawls arranged to engage said ratchet-wheels, and adjustable means for regulating the elevation of the pawls relative to the ratchet-wheels.

10. In combination with a series of indicating-wheels, actuating means therefor including ratchet-wheels intermediate the indicating-wheels, pawls arranged to engage said ratchet-wheels, and adjustable means carried by said pawls for regulating their distances apart to center them between the indicating-wheels.

11. In combination with a series of indicating-wheels, actuating means therefor including ratchet-wheels intermediate the indicating-wheels, pawls arranged to engage said ratchet-wheels, and adjustable means for regulating the distances of the pawls apart to center them between the indicating-wheels.

12. In combination with indicating instrumentalities, a series of ratchet-wheels, spring-pressed pawls arranged to engage said ratchet-wheels, and adjustable means for regulating the elevation of the spring-pressed pawls relative to the ratchet-wheels.

13. In combination with a series of indicating-wheels, actuating means therefor including ratchet-wheels intermediate the indicating-wheels, spring-pressed pawls arranged to engage said ratchet-wheels, and adjustable means for regulating the distance of the pawls apart to center them between the indicating-wheels.

14. In combination with a series of indicating-wheels, actuating means therefor including ratchet-wheels intermediate the indicating-wheels, pawls arranged to engage said ratchet-wheels, and coöperating flanges carried by said pawls for regulating their distances apart to center them between the indicating-wheels.

15. In combination with a series of indicating-wheels, actuating means therefor including ratchet-wheels intermediate the indicating-wheels, pawls arranged to engage said ratchet-wheels, and overlying flanges carried by said pawls for regulating their distances apart to center them between the indicating-wheels.

16. In combination with a series of indicating-wheels, actuating means therefor including ratchet-wheels intermediate the indicating-wheels, pawls arranged to engage said ratchet-wheels, overlying flanges carried by said pawls for regulating their distances apart to center them between the indicating-wheels, and means for locking the same together.

17. In combination with a series of indicating-wheels, actuating means therefor including ratchet-wheels intermediate the indicating-wheels, pawls arranged to engage said ratchet-wheels, overlying flanges carried by said pawls for regulating their distances apart to center them between the indicating-wheels, and a screw passing through one of the flanges and bearing upon the other for locking the same together.

18. In combination with indicating instrumentalities, operating means therefor including a ratchet-wheel, an actuating-pawl therefor, a pivoted carrier for said actuating-pawl, and an adjustable eccentric for rocking said carrier.

19. In combination with indicating instrumentalities, operating means therefor including a ratchet-wheel, an actuating-pawl therefor, a pivoted yoke for said actuating-pawl, and an adjustable eccentric for rocking said yoke.

20. In combination with indicating instrumentalities, operating means therefor including a series of ratchet-wheels, a series of actuating-pawls, separated correspondingly-arranged pivoted carriers for said actuating-pawls, means connecting the actuating-pawls with the carriers and correspondingly-disposed adjustable eccentrics for rocking said pivoted carriers.

21. In combination with indicating instrumentalities, operating means therefor including a series of ratchet-wheels, a series of actuating-pawls, separated correspondingly-arranged pivoted yokes for said actuating-pawls, means connecting the actuating-pawls with the yokes and correspondingly-disposed adjustable eccentrics for rocking said pivoted yokes.

22. In combination with indicating-instrumentalities, operating means therefor including a series of ratchet-wheels, a series of actuating-pawls, separated correspondingly-arranged pivoted carriers for said actuating-pawls, means connecting the actuating-pawls with the carriers, and correspondingly-disposed eccentrics for rocking said pivoted carriers.

23. In combination with indicating instrumentalities, operating means therefor including a series of ratchet-wheels, a series of actuating-pawls, separated correspondingly-arranged pivoted yokes for said actuating-pawls, means for connecting the actuating-pawls with the yokes, and correspondingly-disposed eccentrics for rocking said pivoted yokes.

24. In combination with a supporting structure, a series of indicating-wheels, a shaft upon which said wheels are rotatably mounted, said shaft having a longitudinally-arranged shoulder, actuating means for said wheels adapted to rotate the same in one direction, spring-pressed pawls carried by said wheels arranged to engage the shoulder of the shaft to prevent rotation of the wheels in a reverse direction, means for rotating the shaft to reset the wheels comprising a retractable device normally abutting the end of the shaft provided with a projection normally engaging a recess in said end of the shaft and a portion of the supporting structure, and means for normally forcing said device into locking position.

25. In combination with a supporting structure, indicating instrumentalities, a shaft upon which said instrumentalities are rotatably mounted, said shaft having a longitudinally-arranged shoulder, actuating means for said instrumentalities adapted to rotate the same in one direction, spring-pressed pawls arranged to engage the shoulder of the shaft to prevent rotation of said instrumentalities in a reverse direction, means normally abutting the end of the shaft for rotating the shaft to reset the indicating instrumentalities comprising a retractable device provided with a projection normally engaging a recess in said end of the shaft, said projection having an enlarged inner portion engaging a portion of the supporting structure, and a spring for normally forcing said device into locking position.

26. In combination with a pair of indicating wheels or disks, the first of which is provided with a concentrically-arranged groove in its inner surface opening to a radially-disposed recess or depression, actuating means for the first wheel, and actuating means for the second wheel coöperating with the actuating means for the first wheel controlled by the groove and depression in said first wheel whereby the operation of the second wheel is at a predetermined time relative to the operation of said first wheel.

27. In combination with a pair of indicating wheels or disks, the first of which is provided with a concentrically-arranged groove in its inner surface opening to a radially-disposed recess or depression, actuating means for the first wheel, and actuating means for the second wheel coöperating with the actuating means for the first wheel controlled by the groove and depression in said first wheel whereby the operation of the second wheel is at a predetermined time relative to the operation of said first wheel, said actuating means for the second wheel including a ratchet-wheel carried thereby, a pawl provided with a lateral projection extending into the groove in the first wheel so as to be normally held out of engagement with said ratchet-wheel but arranged to drop into the recess opening to said groove to permit temporary engagement of the pawl with the ratchet-wheel during the operation of the first wheel whereby the second wheel is also operated.

28. In combination with a pair of indicating wheels or disks, the first of which is provided with a concentrically-arranged groove in its inner surface opening to a radially-disposed recess or depression, actuating means for the first wheel, and actuating means for the second wheel coöperating with the actuating means for the first wheel controlled by the groove and depression in said first wheel whereby the operation of the second wheel is at a predetermined time relative to the operation of the first wheel, said actuating means for the second wheel including a ratchet-wheel carried thereby, a pawl provided with a lateral projection carrying an antifriction device extending into the groove in the first wheel so as to be normally held out of engagement with said ratchet-wheel but arranged to drop into the recess opening to said groove to permit temporary engagement of the pawl with the ratchet-wheel during the operation of the first wheel whereby the second wheel is also operated.

29. In combination with a pair of indicating wheels or disks, the first of which is provided with a concentrically-arranged groove in its inner surface opening to a radially-disposed recess or depression, actuating means for the first wheel, and actuating means for the second wheel coöperating with the actuating means for the first wheel controlled by the groove and depression in said first wheel whereby the operation of the second wheel is at a predetermined time relative to the operation of said first wheel, said actuating means for the second wheel including a ratchet-wheel carried thereby, a pawl provided with a lateral projection carrying a roller extending into the groove in the first wheel so as to be normally held out of engagement with said ratchet-wheel but arranged to drop into the recess opening to said groove to permit temporary engagement of the pawl with the ratchet-wheel during the operation of the first wheel whereby the second wheel is also operated.

30. In combination with a measuring-machine of the character described, a support comprising a bracket, a swinging arm between said bracket and machine, and means for limiting the movement of said arm in a downward direction comprising an adjustable stop beneath said arm.

31. In combination with a measuring-machine of the character described, a support comprising a bracket, a swinging arm between said bracket and machine, and means for limiting the movement of said arm in a downward direction comprising an adjustable finger projecting beneath said arm.

32. In combination with a measuring-machine of the character described, a support comprising a bracket, a shaft secured thereon and projecting laterally therefrom, a swinging arm on said shaft carrying the machine at its free end, and means engaging the free outer end of the shaft for preventing removal of the swinging arm from said shaft.

33. In combination with a measuring-machine of the character described, a support comprising a bracket, a shaft secured thereon, a swinging arm on said shaft carrying the machine at its free end, and means for preventing removal of the swinging arm from said shaft comprising a collar engaging the outer end of the shaft and a screw for clamping the collar to the shaft with the swinging arm between the same and the bracket.

34. In combination with a measuring-machine of the character described, a support comprising a bracket, a shaft secured thereon, a swinging arm on said shaft carrying the machine at its free end, means for preventing removal of the swinging arm from said shaft comprising a collar engaging the outer end of the shaft and a screw for clamping the collar to the shaft, and a finger carried by said collar and adjustable therewith, said finger projecting beneath the swinging arm.

35. In combination with a measuring-machine of the character described, a support comprising a bracket, a shaft adapted to be secured to the bracket to project outwardly from either side thereof, a swinging arm on said shaft adapted to project forwardly or rearwardly, and means for connecting said arm to the machine whereby the machine is carried thereby.

36. In combination with a measuring-machine of the character described, a support comprising a bracket, a swinging arm carrying the machine, and means for securing said arm at either side of said bracket, said means permitting said arm to project forwardly or rearwardly relative to the bracket.

37. In combination with a measuring-machine of the character described, a support comprising a bracket, a swinging arm carrying the machine, means for securing said arm at either side of said bracket, said means permitting said arm to project forwardly or rearwardly relative to the bracket, and a reversible stop-finger adapted to project beneath the swinging arm.

38. In combination with a measuring-machine of the character described, a support comprising a bracket, a swinging arm carrying the machine, means for securing said arm at either side of the bracket, and a reversible stop-finger adapted to project beneath the swinging arm.

39. In combination with a measuring-machine of the character described, a support comprising a bracket, a swinging arm carrying the machine, means for securing said arm at either side of said bracket, said means permitting said arm to project forwardly or rearwardly relative to the bracket, and an adjustable stop-finger adapted to project beneath the swinging arm.

40. In combination with a measuring-machine of the character described, a support comprising a bracket, a swinging arm carrying the machine, means for securing said arm at either side of the bracket, and an adjustable stop-finger adapted to project beneath the swinging arm.

41. In combination with a series of indicating-wheels, actuating means therefor including ratchet-wheels intermediate the indicating-wheels, pawls arranged to engage said ratchet-wheels, and coöperating flanges carried by said pawls.

42. In combination with a series of indicating-wheels, actuating means therefor including ratchet-wheels intermediate the indicating-wheels, pawls arranged to engage said ratchet-wheels, and overlying flanges carried by said pawls.

43. In combination with indicating instrumentalities, a series of ratchet-wheels, pawls arranged to engage said ratchet-wheels, and means carried by the pawls for regulating their elevation.

44. In combination with a series of indicating-wheels, actuating means therefor including ratchet-wheels intermediate the indicating-wheels, pawls arranged to engage said ratchet-wheels, overlying flanges carried by said pawls, and means for locking the same together.

45. In combination with a series of indicating-wheels, actuating means therefor including ratchet-wheels intermediate the indicating-wheels, pawls arranged to engage said ratchet-wheels, overlying flanges carried by said pawls and a screw passing through one of the flanges and bearing upon the other.

In testimony whereof I affix my signature in presence of two witnesses.

EMIL EK.

Witnesses:
 ARVID EK,
 NILS EK.